United States Patent [19]

Bergmann

[11] Patent Number: 4,968,152
[45] Date of Patent: Nov. 6, 1990

[54] ELECTRIC IMMERSION THERMOMETER

[75] Inventor: Konrad Bergmann, Wittlich, Fed. Rep. of Germany

[73] Assignee: American Standard Inc., New York, N.Y.

[21] Appl. No.: 272,377

[22] Filed: Nov. 17, 1988

[51] Int. Cl.$^5$ ............... G01K 13/02; F16K 37/00
[52] U.S. Cl. ................................. 374/147; 307/117; 137/551
[58] Field of Search ............... 374/147, 148, 136, 178; 338/34, 26, 22 R; 137/551; 236/12.1

[56] References Cited

U.S. PATENT DOCUMENTS

| | | | |
|---|---|---|---|
| 3,260,111 | 7/1966 | Godbey | 374/136 X |
| 3,441,893 | 4/1969 | Gordon et al. | 338/26 |
| 3,537,053 | 10/1970 | Snoberger et al. | 338/25 |
| 4,241,868 | 12/1980 | Perkins | 137/551 X |
| 4,246,786 | 1/1981 | Wiemer et al. | 338/22 R X |
| 4,377,800 | 3/1983 | Fuld et al. | 374/46 X |
| 4,437,084 | 3/1984 | Clayton, Jr. | 338/22 R |
| 4,445,109 | 4/1984 | Naganoma | 338/22 R |
| 4,456,390 | 6/1984 | Junkert et al. | 374/178 X |
| 4,510,343 | 4/1985 | Sivyer | 374/208 X |
| 4,682,626 | 7/1987 | Bergmann | 307/117 X |
| 4,805,444 | 2/1989 | Webb | 73/405 R |

FOREIGN PATENT DOCUMENTS 6928209 3/1971 Fed. Rep. of Germany.

OTHER PUBLICATIONS

Band 14-Lexikon Der Feinwerktechnik-L-Z-pp. 504, 609 & 610 Alfred Kuhlenkamp; ©1969, (TN 2122).

*Primary Examiner*—Daniel M. Yasich
*Attorney, Agent, or Firm*—John P. Sinnott

[57] ABSTRACT

An electric immersion thermometer, for use in a device such as a mixing faucet, is disclosed. The immersion thermometer includes a body which houses a temperature sensing assembly in which the sensing element is encapsulated or laminated in a plastic sheath or jacket. The encapsulating sheath being formed from a plastic thermally shrinking tubing and a plastic bracket for mechanically supporting the thermometer. A plastic insert also can be mounted in the body of the immersion thermometer that is coupled to the faucet. The plastic jacket has good heat conducting and electrical insulating properties.

9 Claims, 4 Drawing Sheets

ELECTRIC IMMERSION THERMOMETER

BACKGROUND OF THE DISCLOSURE

1. Field of the Invention

The invention relates to an electric immersion thermometer for a standing or flowing medium, in particular water. The immersion thermometer includes a mount or body, preferably in the form of a screw fitting, a tubular housing, having a temperature sensor that protrudes into the medium, is sealed into the mount and is electrically insulated from the medium, and is heat conductively connected to the medium by way of the tubular housing. The temperature sensor includes a sensor element, preferably in the form of a semiconductor, and electrical connecting lines which pass through the tubular housing to the mount.

2. Description of the Prior Art

Electric immersion thermometers are known and generally include a housing with temperature sensor inside, which is immersed in the medium and is in continuous heat-conductive communication with the medium. Such an electric immersion thermometer is disclosed in "Lueger, Lexikon der Technik, Vol. 14, Lexikon des Feinwerktechnik L-Z, DVA, Stuttgart 1969 at Thermometer and Widerstandsthermometer". An elongated rod-like sensor is contained in an insert tube of electrically insulating material which, in turn, is set in a tubular metal housing, closed at one end and anchored in the mount or body member at the other end. The insert tube terminates at the end located in the mount in a circular heat plate of electrically insulating material on which electrical terminals are arranged for the connecting lines of the temperature sensor. The sensor element of the temperature sensor may be a metal resistor with positive temperature coefficient, a semiconductor resistor with negative temperature coefficient, and a thermocouple or the like.

Owing to the tubular housing consisting of metal and because of the fact that the temperature sensor itself is again protected by an inner insert tube of electrically insulating material, the known electric immersion thermometer is especially strong mechanically. However, by virtue of this design, the conventional immersion thermometer is fairly large and rather expensive to make. Some disadvantages of this immersion thermometer are its relatively long lag time for heat transfer from the medium to the sensor element, and the rather high heat capacity of the housing, the insert tube and the temperature sensor.

In various fields of application, particularly in the field of electronic thermostats for mixing faucets and the like, there has long been a need for compact, rapid temperature response and yet economical immersion thermometers. This need is not met by the aforementioned known immersion thermometer or similar immersion thermometers. Therefore, an object of the invention is to provide a compact, economically manufactured electric immersion thermometer with extremely rapid temperature response for mixing faucets or the like.

SUMMARY OF THE INVENTION

The electric immersion thermometer, according to the present invention, includes a housing which is in the form of a jacket that is placed directly on the sensor element and connecting lines so that only the connection ends of the lines are exposed. The jacket is made of an electrically insulating material of good heat conductivity, not susceptible to attack by the medium, i.e. water, and preferably mechanically strong. It has been found that modern protective materials have excellent mechanical strengths that, at least for a great many applications, the twofold construction of insert tube and housing, as in the prior art, may be dispensed with so that a single housing of electrically insulating material is of sufficient strength for the temperature sensor. This single housing, according to the invention, is placed directly on the sensor element and the connecting lines as a jacket, where of course, the sensor element and the connecting lines are each jacketed separately. The arrangement of such a jacket has a very low heat capacity and the magnitude of the heat capacity may be further influenced also by the choice of the materials forming the jacket. The choice of material and the choice of thickness of the jacket will determine its protective action, for example, its insulation resistance, its breakdown voltage, its resistance to various media, as well as its mechanical strength, etc. By the form of application as a jacket, the resistance to heat transfer between medium and temperature sensor element can be lowered to a value close to the mathematical minimum. At the same time, a minimal heat capacity of the entire system is achieved. Furthermore, such a jacket and temperature sensor combination is economical to manufacture and the overall size of the assembly is small.

Other preferred embodiments of the invention will become apparent from the following description of the invention with reference to the drawings, by way of example.

DETAILED DESCRIPTION OF THE PREFERRED EMBODIMENT

Figure 1:
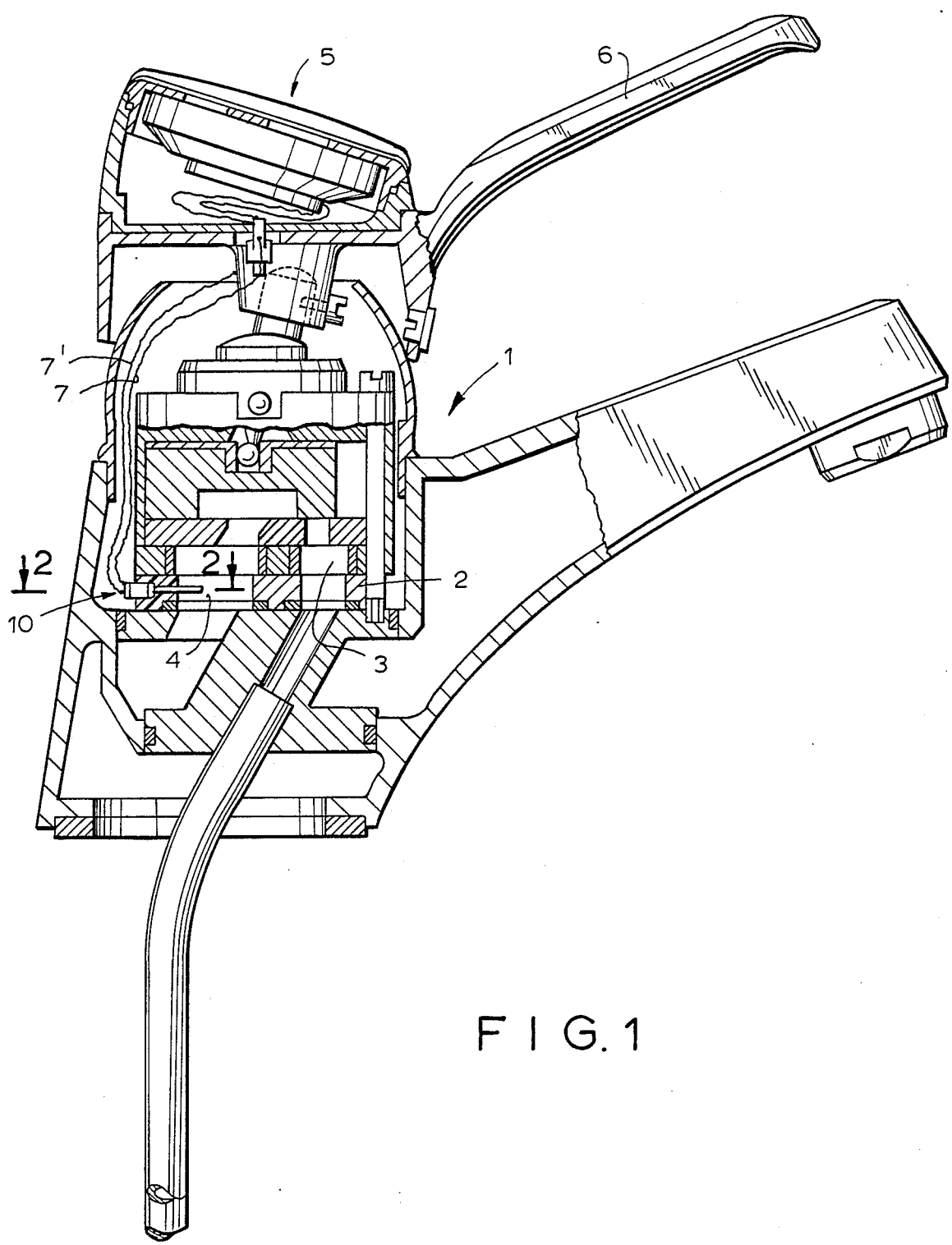
FIG. 1 is an elevational view, partly in section, of a mixing faucet having an immersion thermometer operably mounted according to the invention herein.

FIG. 1 shows a single-lever mixing faucet 1, having a temperature display made in accordance With my U.S. Pat. No. 4,682,626 granted July 28, 1987, the subject matter of which is incorporated herein. The faucet includes a sensor plate 2 having a hot water opening 3, a cold water inlet opening, not shown, and an outlet opening 4. Immersion thermometer 10 is mounted in sensor plate 2 and is electrically connected to temperature assembly mounted in handle assembly 6 through conductors. Immersion thermometer 10 is shown in full assembly in FIG. 2, mounted in sensor plate 2. Immersion thermometer 10 is intended for use in a standing or flowing medium, in particular, water. While electric immersion thermometer 10 is suitable. In general, for all kinds of applications for standing or flowing media because of its compact construction, it is suitable for use in mixing faucets having electronic thermostats. In such applications, immersion thermometer 10 is subjected to relatively slight mechanical stresses, and the chemical exposure of the medium, i.e water, is negligible.

Figure 2:
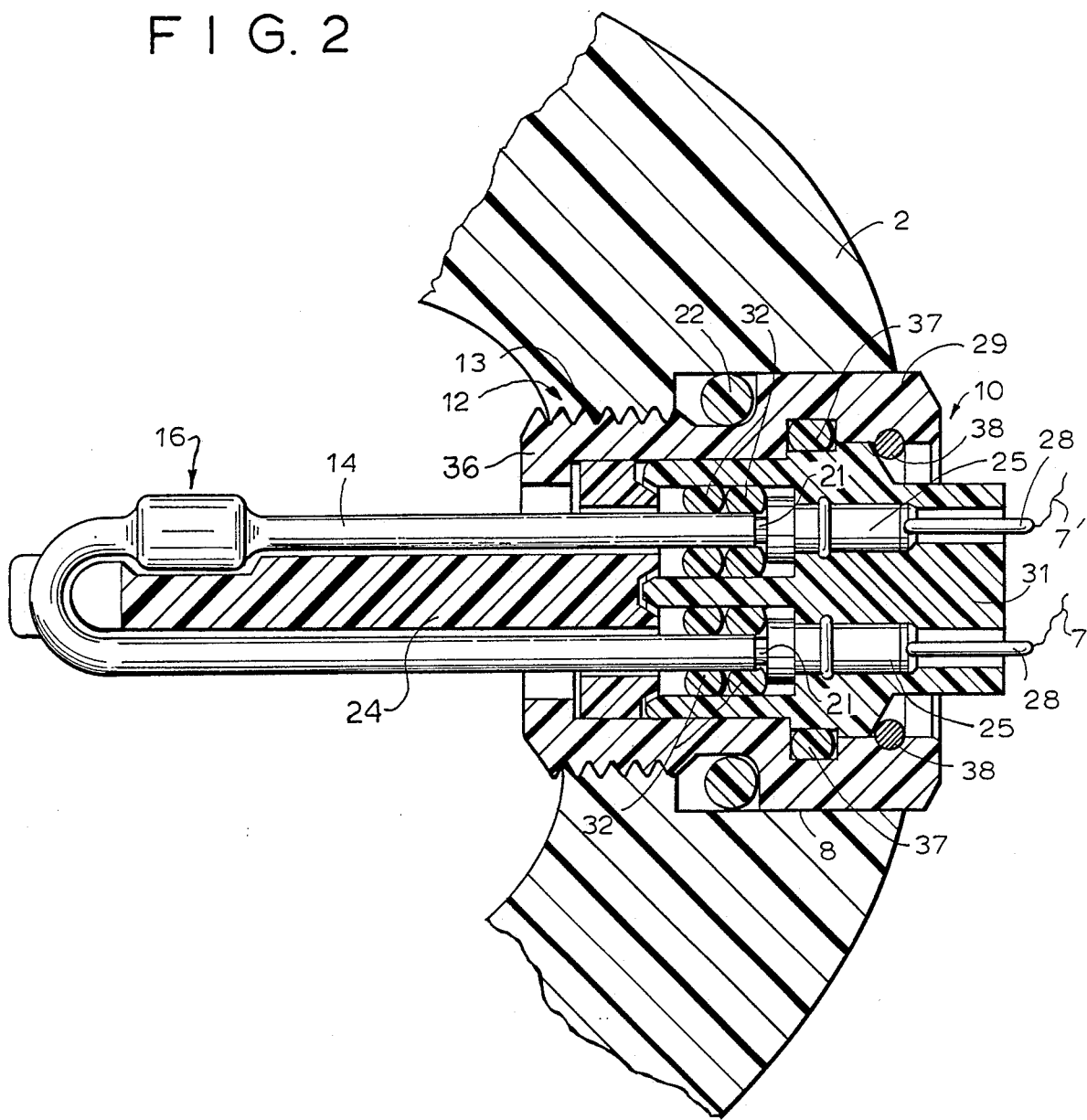
FIG. 2 is an enlarged sectional view of the immersion thermometer, taken along lines 2—2 of FIG. 1.
Figure 3:
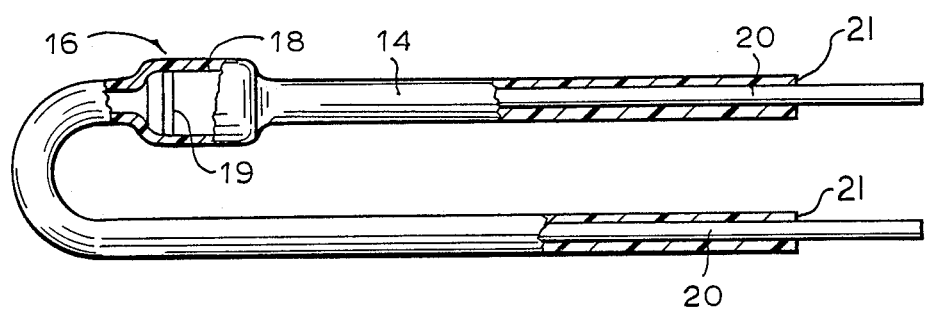
FIG. 3 is an enlarged elevational view, partially in section, of the jacketed temperature sensor of the immersion thermometer of FIG. 2.

Electric immersion thermometer 10, shown in FIGS. 2 and 3, comprises a body 12, shown in the form of a screw fitting, and a housing or jacket 14 having a temperature sensor 16 mounted therein which protrudes into a medium such as water, not shown. Temperature sensor 16 is electrically insulated from the medium and is heat conductively connected with the medium by way of jacket 14. Temperature sensor 16 as shown in FIG. 3 comprises a sensor element 18 as described, for example, in U.S. Pat. No. 4,682,626 granted July 28, 1987, and electrical connecting lines 20 which pass through jacket 14 and body 12 (FIG. 2). By means of body 12 and O-ring 22 arranged thereon for sealing, using the indicated external thread 13, immersion thermometer 10 is threadedly connected into a complimentary threaded socket 8 in the wall of sensor plate 2 of faucet 1 (FIG. 1). Other modes of installation may be used, for example, an insertion fitting or a fitting having an encircling flange, epoxy or the like.

One aspect of the invention is to provide a cover or housing 14, in the form of a jacket, which is placed directly on sensor element 18 and connecting lines 20 as a lamination that leaves only connection ends 21 of connecting lines 20 exposed. Jacket or housing 14 consists of electrically insulating material, of good heat conductivity, and which is not attacked by the medium. Mechanically, the material should be as strong as the service of the particular immersion thermometer requires. Various means can be employed to encapsulate sensor element 18 and connecting lines 20. Choice of material and thickness of jacket 14 may be adjusted to any desired effects, for example, the requirement of a sufficiently high electrical insulation strength. i.e. 500 volts to the type used in FIG. 1.

According to the invention, housing 14 is in the form of a jacket which is applied directly to sensor element 18 and connecting lines 20 to form surface-to-surface contact therebetween for maximum heat conductivity. This will provide the desired low bulk density, low heat capacity and low resistance to heat transfer between the medium and sensor element 18. Jacket 14 encloses sensor element 18 and connecting lines 20, for example, by capsuling temperature sensor 18 and connecting lines 20 in glass, a known practice for thermometers. Mechanical sensitivity, even with high-grade types of glass, is not the material of choice for the applications for use in mixing faucets. The material more suited for the present applications is to apply a coating of plastic to sensor element 18. Various known plastics may be used as coating materials, for example, PTFE (trademarks Teflon, Hostaflon, etc.), polyamide, etc. The plastic jacket or coating may be applied as by injection imbedding techniques which are suitable for very small sensor elements and very light connecting lines. Such processes are also known in the art.

Use of shrink tubing to form jacket 14 has been found especially advantageous to encapsulate sensor element 18 and connecting lines 20. The shrink tubing may for example, be made from polytetrafluoroethylene, polyamide, silicone, polyolefine, etc. The choice of a plastic material will depend on the field of application of the immersion thermometer, in particular, the chemical properties of the medium and the temperature ranges to which jacket 14 is to be subjected.

Use of shrink tubing to form jacket 14 optimizes face-to-face contact around temperature sensor 16 and connecting lines 20 so that the resistance to heat transfer will be as small as possible. Temperature sensor 16 and connecting lines 20 are assembled by slipping jacket 14 over temperature sensor 16 and connecting lines 20 before the tube is shrunk; thereafter, the tube is shrunk to complete the jacketed assembly.

Improvements have been made in the manufacture of sensor element 18 and connecting lines 20 so that they are made small and light. Temperature sensor 16, if in elongated form, is not very stable mechanically, and will tend to kink even when jacket 14 is in its shrunken state. It is advantageous to provide an elongated bracket 24, having a collar 28, shown in FIGS. 4 and 5, preferably made of electrically insulating plastic of low heat capacity, to mechanically support jacketed temperature sensor 16 and connecting lines 20. Bracket 24 also includes insertion groove 26 which is an open channel so that after assembling jacket 14 with temperature sensor 16 and connecting lines 20, the assembly fits snugly into groove 26. The shape of bracket 24 should be such as to provide mechanical stability but, at the same time, have low heat capacity to avoid rendering the entire measuring system too sluggish. Bracket 24 is made from a plastic material, for example, an acetal copolymer (trademark, e.g. Hostaflon).

In a mixing faucet, of the type shown in FIG. 1, temperature sensor 16, connecting lines 20 and jacket 14 are made in the form of an elongated "U", shown in FIG. 8. A bracket 24, shown in FIG. 4, is an elongated rod-like member having insertion groove 26 which is in the form of an elongated "U" that is complimentary to the U-shaped, jacketed temperature sensor so that when assembled, the jacketed temperature sensor and groove 26 of bracket 24 are in surface-to-surface contact and when coupled to body 12, form temperature sensor assembly 10, shown in FIG 1.

Figure 4:
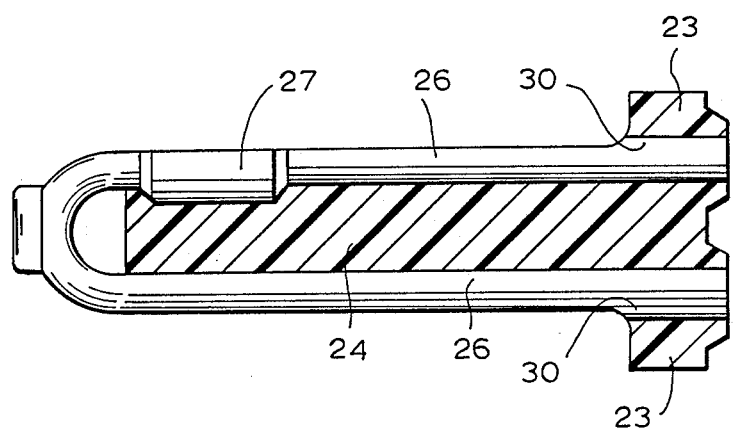
FIG. 4 is an enlarged sectional view, in elevation, of a bracket for the immersion thermometer of FIG. 2.
Figure 5:
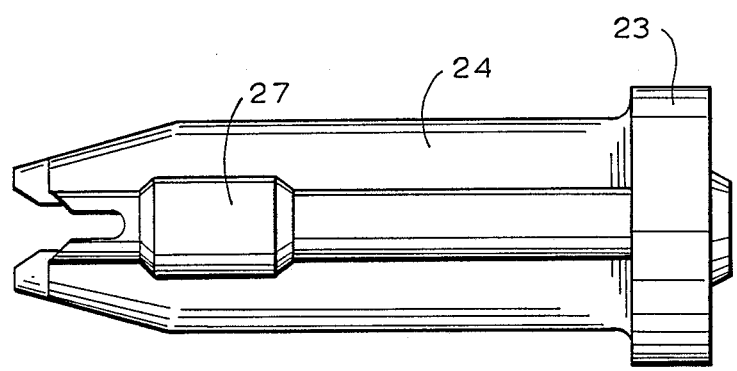
FIG. 5 is an enlarged elevational view of the bracket of FIG. 4.

Also shown in FIG. 4, enlarged section 27 is formed in the top of bracket 24 of insertion groove 26 to accept sensor element 18. The dimensions of sensor element 18 may vary as well as its location in groove 26 so that it may be positioned in groove 26 at the tip of bracket 24, or between groove 26, shown in FIG. 5, or in the bottom of groove 26. Such variations may be required due to the hydrodynamic considerations to meet the flow of the medium. On bracket 24, at the end associated with annular holder 29 (FIG. 2) on the collar 23, as shown in FIG. 4, are two openings 30 (FIG. 4) to position bracket 24 with jacketed temperature sensor therein.

Figure 7:
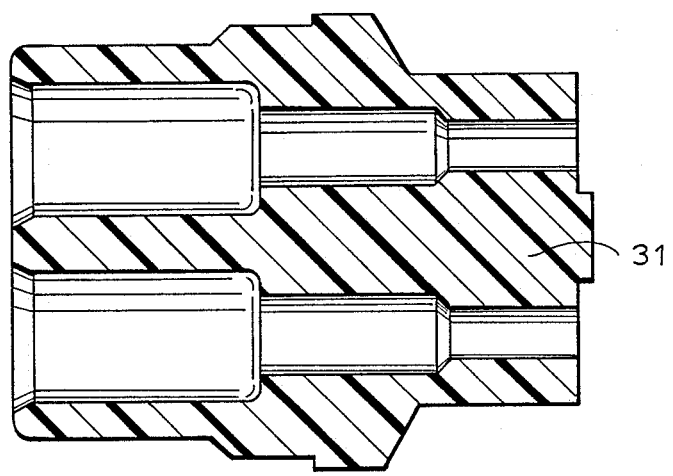
FIG. 7 is an enlarged sectional view of a contactor for the immersion thermometer of FIG. 2.

FIGS. 1, 2 and 7, in combination, show immersion thermometer IO according to the invention. Jacket 14, at its free ends 21 (FIG. 3), is fitted with two O-rings 32 (FIG. 2). Cylindrical contactor 81 is inserted into annular holder 29 to seal the jacketed temperature sensor therein. This is an especially simple and effective means to assemble and seal temperature sensor 16 in annular holder 29.

Figure 6:
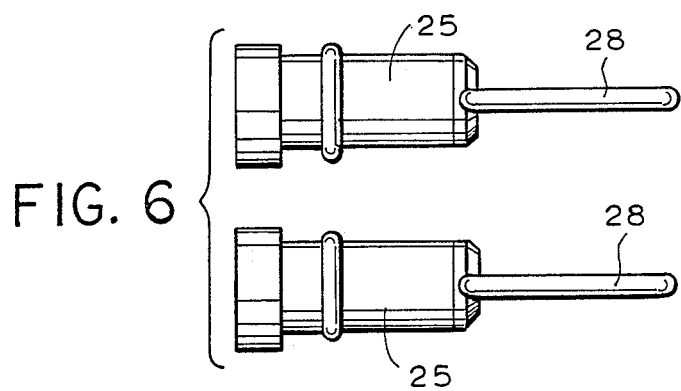
FIG. 6 is an enlarged elevational view of the contact element shown in FIG. 2.

Precision electrical contact elements 25, shown in FIG. 6, are provided in cylindrical contactor 31 to connect the free ends 21 of connecting lines 20. Contact elements 25 include conducting elements 28 to electrically connect conductors 7,7', shown in FIG. 1. The highly compact construction of immersion thermometer in accordance with the invention, suggests the expediency of mounting them to precision contact elements 25 in cylindrical contactor to conducting elements 28 which lead to the outside of body 12, rather than using ordinary screw connectors.

For simplicity of manufacture of immersion thermometer 10, it is preferred to construct it in multipartite form. Immerse on thermometer 10 (FIG. 2) includes an annular holder 29 and a bracket 24 which is inserted into annular holder 29 and clamped therein by cylindrical contactor 31. The assembly is sealed by O-rings 32 positioned around connecting ends 21 inserted in the holder 31. precision contact elements 25, With conducting elements 28, provide means to connect conductor 7,7' to temperature assembly 5 (FIG. 1). Cylindrical contactor 31 is made of an electrically insulating material, possibly the same material as that of bracket 24. Then, annular holder 29 may be made of a metal part, for example, brass, aluminum or the like, so that it will possess the necessary strength, for example, as a screw fitting. In cylindrical contactor 31, the several parts to be installed may then be inserted in annular holder 29. As shown in FIG. 2, cylindrical contactor 31 is held in annular holder 29 by a spring ring 38, which is a convenient assembly, to provide a compact form. Contact elements 25, FIG. 6, are preassembled in cylindrical contactor 81 and then inserted into annular holder 29, as shown in FIG. 2.

Cylindrical contactor 31 is impermeably sealed off from annular holder 29 by an encircling seal or O-ring 87 which is arranged between cylindrical contactor 31 and annular holder 29 to insure a fluid tight seal, shown in FIG. 1.

Annular holder 29 comprises an inward-projecting annular flange 36 against which collar 23 of bracket 24 is biased, and against which O-rings 32 are pressed by cylindrical contactor 31 and held in place by spring ring 38. This results in a firm and dependable connection of all parts of immersion thermometer 10 even though the dimensions of electronic thermostat 10 are extremely small.

Sensor element 18 (FIG. 2) of immersion thermometer 10 is as described, for example, in U.S. Pat. No. 4,246,786 granted Jan. 27, 1981 to Wiener, et al. for "Fast Response Temperature Sensor And Method of Making," can be made of a semiconductor device. This type of sensor element is extremely small and has outstanding properties for temperature measurement. Care must be taken to connect sensor element 18 with the correct polarity so that the diode will be connected in transmission mode in the correct manner for purposes of measurement.

Electronic thermometer 10, shown in the mixing faucet of FIG. 1, has an overall length of about 30 mm, a maximum outside diameter of about 12 mm in the region of body 12, and slightly over 5 mm in the region of temperature sensor 16 (FIG. 2) and bracket 24. Jacket 14, in the form of shrink tubing, is about 2 mm in outside diameter before shrinking and about 1.2 mm after shrinking, and nests in semicircular insertion groove 26 (FIG. 4) of bracket 24. The diameter of groove 26 is of about 1.2 mm in the region of connecting lines 20 (FIG. 3), and a diameter of about 1.8 mm in the region of sensor element 18.

The ring 19, seen in FIG. 8 of sensor element 18, is in the form of a diode poled in the direction of transmission and marks the cathode of the diode, i.e. connecting line 20 for the negative pole Corresponding color coding of connection elements and, possibly, an assymmetrical form of the insertion contours, will provide a clear relationship among the several parts so that the installed position of sensor element 18 will be uniquely reproducible in a mixing faucet of FIG. 1.

It is claimed:

1. An electric immersion thermometer having a sensor plate for use in a fluid medium comprising:
   a body to be coupled to a device having the fluid medium therein;
   a temperature sensor assembly mounted in the sensor plate;
   said temperature sensor assembly including a sensor element and coupled to an electrical conductor to be electrically connected to a temperature display operably coupled to said device;
   said sensor element and said conductor are encapsulated to form a cover which is in intimate contact therewith, and which mechanically supports the temperature assembly;
   said cover, formed of a plastic material having good heat conductivity and electrically insulating properties, is substantially inert to said medium;
   wherein said cover is in the form of a plastic shrink tubing in the form of a lamination for direct immersion in the fluid medium; and
   a bracket made of an electrically insulating plastic having a low heat capacity, said bracket providing mechanical support for said temperature assembly.

2. An electric immersion thermometer according to claim 1 further comprising a mixing faucet, wherein the sensor plate having hot and cold water inlets in fluid communication with a water outlet opening in said sensor plate has means for proportioning mixed hot and cold water through said water outlet, and a temperature display assembly coupled thereto, the sensor plate providing a mounting for the immersion thermometer.

3. The immersion thermometer according to claim 1 wherein said temperature sensor assembly includes a plastic insert mounted in said body, said insert having said at least one O-ring to form a fluid tight seal between said temperature sensor assembly and said insert.

4. The immersion thermometer according to claim 3 wherein said insert is impermeably sealed in said body by an O-ring seal disposed between said insert and said body.

5. The immersion thermometer according to claim 1 wherein said bracket includes a recess in the form of a generally continuous, semi-cylindrical channel which is complimentary to said temperature sensor assembly which nests therein.

6. The immersion thermometer according to claim 1 wherein the temperature sensor assembly and cover are in the form of an elongated "U", the free ends of which are mounted in said body.

7. The immersion thermometer according to claim 6 wherein said free ends are sealed in said body in a fluid tight fit be at least one O-ring.

8. The immersion thermometer according to claim 1 wherein said temperature sensor assembly includes electrical conducting contact elements mounted in said body, said contact elements adapted to be electrically connected to said display.

9. The immersion thermometer according to claim 1 wherein said temperature assembly includes a semiconductor resistor.

* * * * *